US011863656B2

(12) United States Patent
Knowles

(10) Patent No.: US 11,863,656 B2
(45) Date of Patent: *Jan. 2, 2024

(54) METHOD AND APPARATUS FOR TIME SYNCHRONISATION IN WIRELESS NETWORKS

(71) Applicant: Imagination Technologies Limited, Kings Langley (GB)

(72) Inventor: Ian R. Knowles, Burnham (GB)

(73) Assignee: Imagination Technologies Limited, Kings Langley (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/867,296

(22) Filed: Jul. 18, 2022

(65) Prior Publication Data
US 2022/0353055 A1 Nov. 3, 2022

Related U.S. Application Data

(63) Continuation of application No. 16/661,712, filed on Oct. 23, 2019, now Pat. No. 11,394,524, which is a (Continued)

(30) Foreign Application Priority Data

Sep. 23, 2011 (GB) .................................. 1116521
May 24, 2012 (GB) .................................. 1209312

(51) Int. Cl.
H04L 7/08 (2006.01)
H04N 21/43 (2011.01)
(Continued)

(52) U.S. Cl.
CPC .............. *H04L 7/08* (2013.01); *H04J 3/0667* (2013.01); *H04N 5/06* (2013.01); (Continued)

(58) Field of Classification Search
CPC ........... H04L 7/08; H04J 3/0667; H04N 5/06; H04N 21/4305; H04W 56/001
See application file for complete search history.

(56) References Cited

U.S. PATENT DOCUMENTS 6,347,084 B1 2/2002 Hulyalkar et al.
7,480,315 B2 1/2009 Virdi et al.
(Continued)

FOREIGN PATENT DOCUMENTS

CN 101047911 A 10/2007
CN 101202613 A 6/2008
(Continued)

OTHER PUBLICATIONS

Bang et al: "Wireless network synchronization for multichannel multimedia services", Advanced Communication Technology, 2009. ICACT 2009. 11th International Conference on, GIRI, Piscataway, NJ, USA, Feb. 15, 2009, pp. 1073-1077, XP031445859, ISBN: 978-89-5519-138-7.
(Continued)

Primary Examiner — Raj Jain
(74) Attorney, Agent, or Firm — Potomac Law Group, PLLC; Vincent M DeLuca

(57) ABSTRACT

A wireless media distribution system is provided comprising an access point (6) for broadcasting media and a plurality of stations (2) for reception and playback of media. Each station is configured for receiving and decoding a timestamp in a beacon frame transmitted repeatedly from the access point. This is used to control the output signal of a station physical layer clock (12) which is then used as a clock source for an application layer time synchronisation protocol. This application layer time synchronisation protocol can then be used in the station to control an operating system clock (8) for regulating playback of media.

20 Claims, 6 Drawing Sheets

Multiple-protocol layer synchronisation technique

Related U.S. Application Data continuation of application No. 15/701,677, filed on Sep. 12, 2017, now Pat. No. 10,491,371, which is a continuation of application No. 15/242,820, filed on Aug. 22, 2016, now Pat. No. 9,794,058, which is a continuation of application No. 14/198,989, filed on Mar. 6, 2014, now Pat. No. 9,444,567, which is a continuation of application No. 13/623,828, filed on Sep. 20, 2012, now Pat. No. 8,707,077.

(51) Int. Cl.
*H04W 56/00* (2009.01)
*H04N 5/06* (2006.01)
*H04W 84/12* (2009.01)
*H04J 3/06* (2006.01)
*H04W 88/08* (2009.01)

(52) U.S. Cl.
CPC ...... *H04N 21/4305* (2013.01); *H04W 56/001* (2013.01); *H04W 84/12* (2013.01); *H04W 88/08* (2013.01)

(56) References Cited

U.S. PATENT DOCUMENTS

| | | | |
|---|---|---|---|
| 7,483,450 B1 * | 1/2009 | Giese | H04J 3/0673 370/503 |
| 7,668,243 B2 | 2/2010 | Ho et al. | |
| 7,940,811 B2 | 5/2011 | Gervais et al. | |
| 8,279,897 B2 | 10/2012 | Lee et al. | |
| 8,719,432 B1 * | 5/2014 | Vermeulen | G06F 9/526 707/704 |
| 9,794,058 B2 * | 10/2017 | Knowles | H04N 21/4305 |
| 10,491,371 B2 * | 11/2019 | Knowles | H04N 21/4305 |
| 11,394,524 B2 * | 7/2022 | Knowles | H04W 56/001 |
| 2005/0084003 A1 | 4/2005 | Rosen et al. | |
| 2005/0084033 A1 * | 4/2005 | Rosen | H04L 27/2601 375/295 |
| 2006/0146850 A1 * | 7/2006 | Virdi | G06F 1/14 375/E7.278 |
| 2006/0168312 A1 | 7/2006 | Young et al. | |
| 2009/0089456 A1 | 4/2009 | Stanton | |
| 2009/0100189 A1 | 4/2009 | Bahren et al. | |
| 2009/0204843 A1 | 8/2009 | Celinski et al. | |
| 2010/0086093 A1 | 4/2010 | Sheet | |
| 2010/0118837 A1 * | 5/2010 | Bracha | H04W 56/00 370/336 |
| 2011/0261917 A1 * | 10/2011 | Bedrosian | H04J 3/0697 375/371 |
| 2012/0005517 A1 * | 1/2012 | Foster | G06F 1/12 713/500 |
| 2012/0117180 A1 * | 5/2012 | Ranasinghe | H04J 3/0667 709/208 |
| 2020/0059349 A1 * | 2/2020 | Knowles | H04W 84/12 |

FOREIGN PATENT DOCUMENTS

| | | |
|---|---|---|
| CN | 101202918 A | 6/2008 |
| CN | 101335587 A | 12/2008 |
| CN | 101512955 A | 8/2009 |
| CN | 101739011 A | 6/2010 |
| JP | 2007-124029 A | 5/2017 |
| WO | 2007/076575 A1 | 7/2007 |
| WO | 200801029 A2 | 1/2008 |

OTHER PUBLICATIONS

Mahmood A et al: "Software support for clock synchronization over IEEE 802.11 wireless LAN with open source drivers", Precision Clock Synchronization for Measurement Control and Communication (ISPCS), 2010 International IEEE Symposium on, IEEE, Piscataway, NJ, USA Sep. 27, 2010, pp. 61-66, XP031780851, ISBN: 978-1-4244-5978-0.

Vallat et al., "Clock Synchronization in Telecommunications via PTP (IEEE 1588)," IEEE International Frequency Control Symposium, pp. 334-341 (2007).

\* cited by examiner

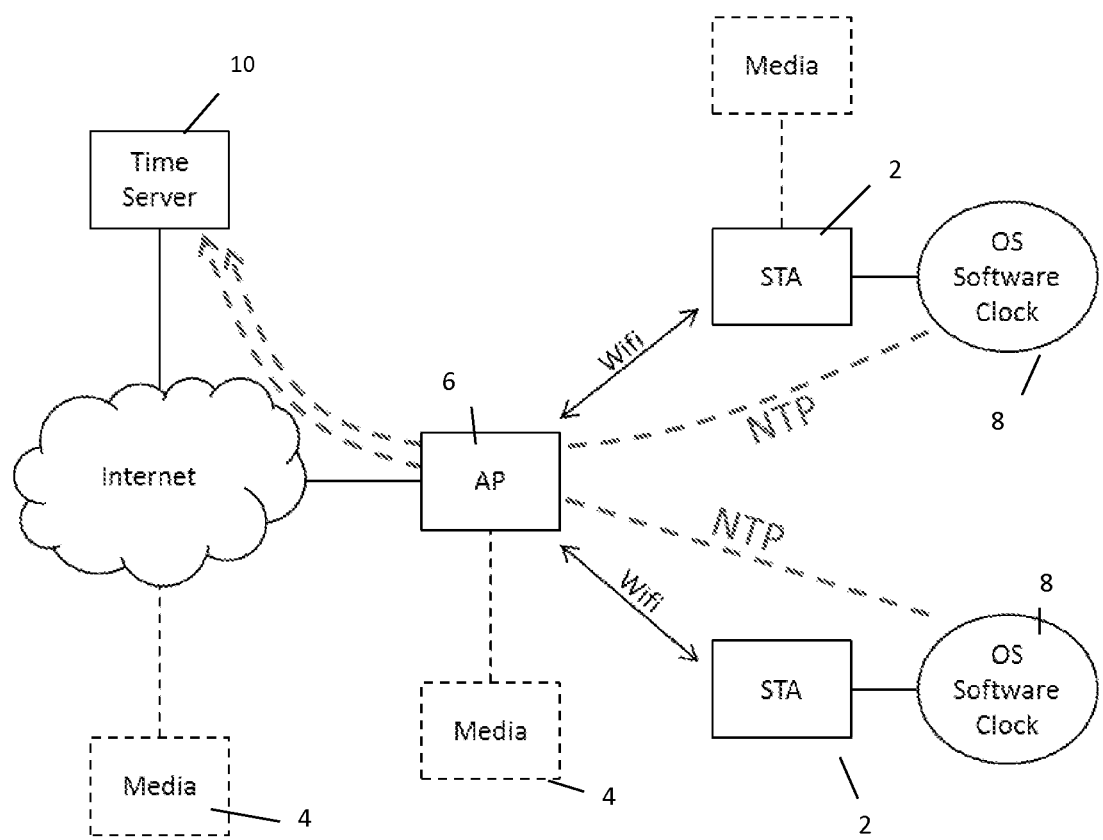
Figure 1 – Prior art NTP sync technique

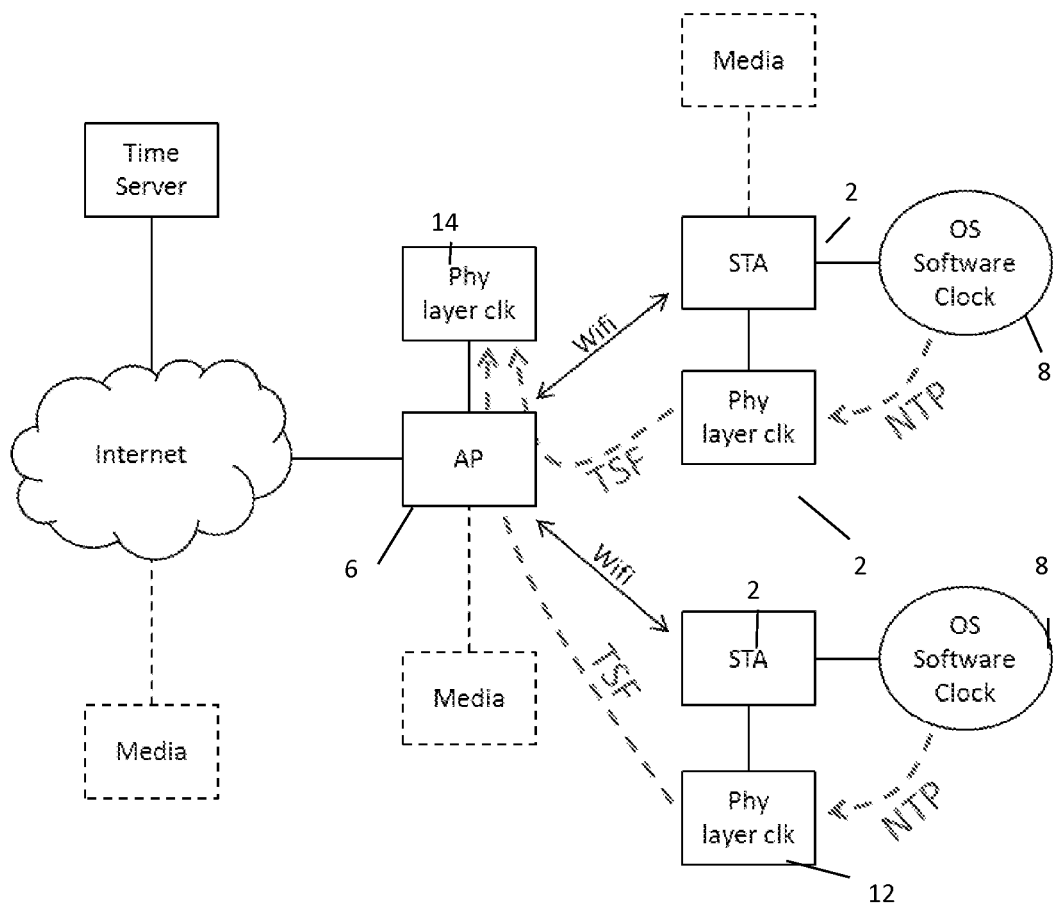
Figure 2 – Multiple-protocol layer synchronisation technique

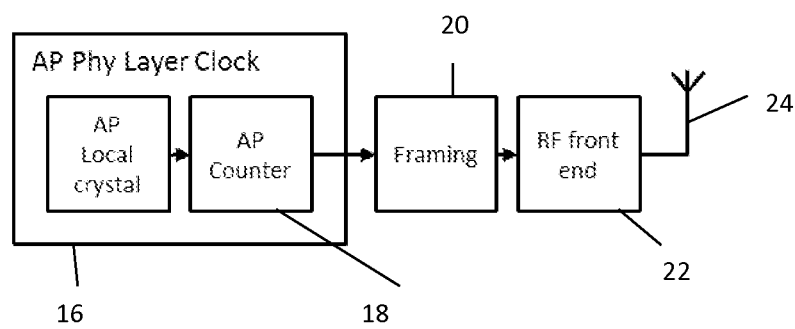
Figure 3 – AP physical layer clock structure

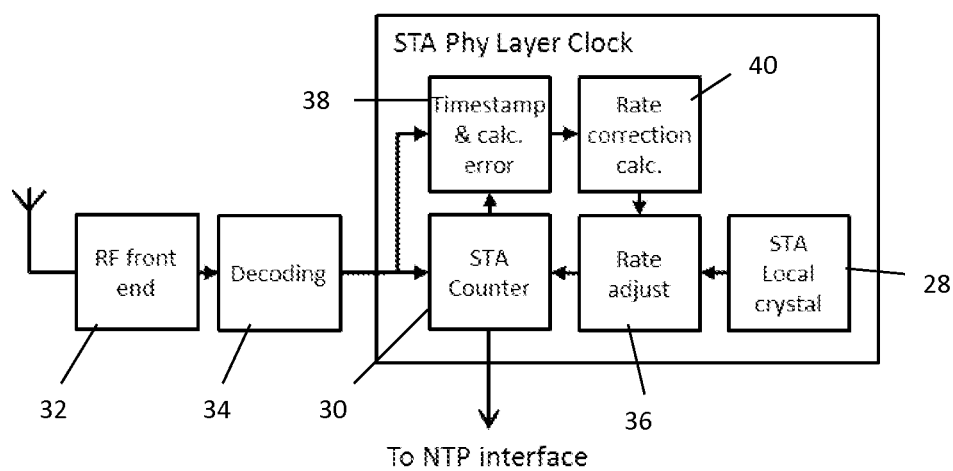
Figure 4 – First example STA physical layer clock structure

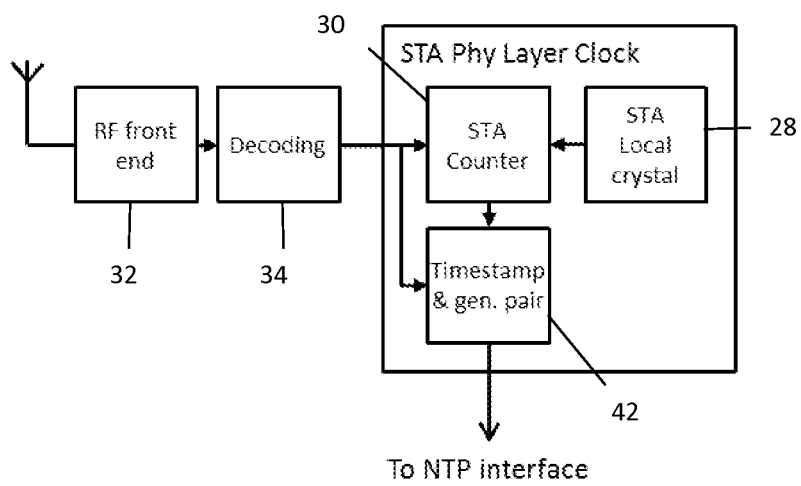
Figure 5 – Second example STA physical layer clock structure

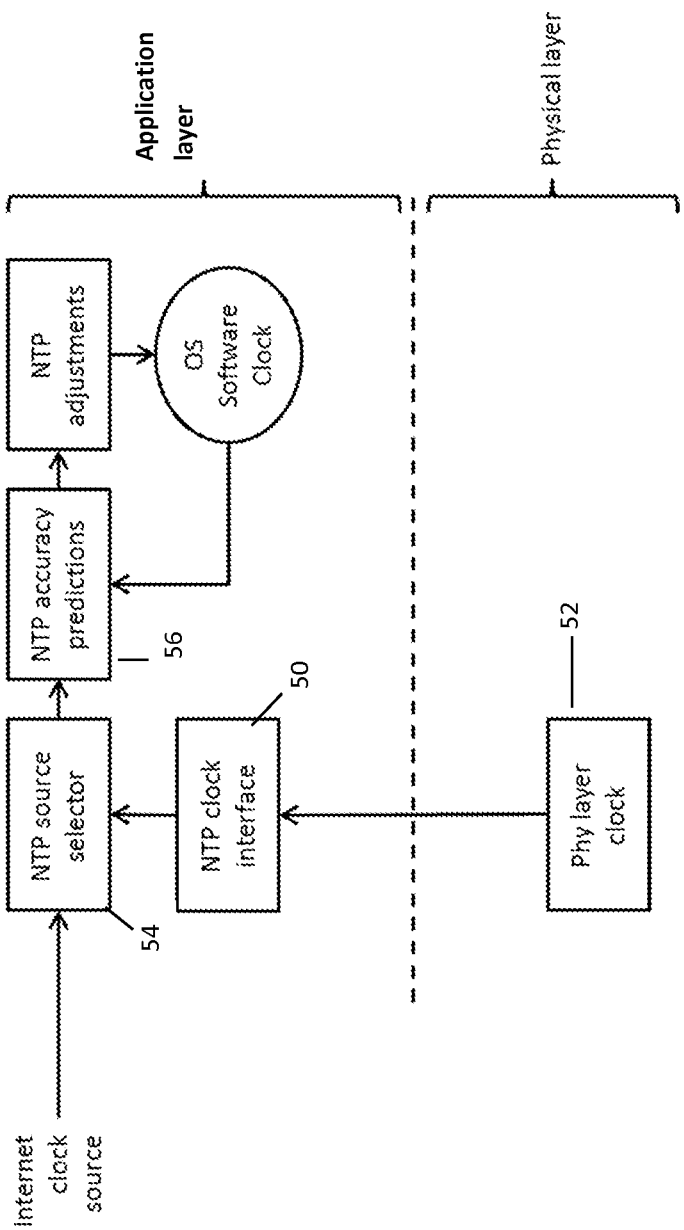
Figure 6 – NTP adjustment of OS software clock

METHOD AND APPARATUS FOR TIME SYNCHRONISATION IN WIRELESS NETWORKS

CROSS REFERENCE TO RELATED APPLICATIONS

This application is a continuation of copending U.S. patent application Ser. No. 16/661,712 filed Oct. 23, 2019, to be issued as U.S. Pat. No. 11,394,524, which is a continuation of prior application Ser. No. 15/701,677 filed Sep. 12, 2017, now U.S. Pat. No. 10,491,371, which is a continuation of prior U.S. application Ser. No. 15/242,820 filed Aug. 22, 2016, now U.S. Pat. No. 9,794,058, which is a continuation of prior U.S. application Ser. No. 14/198,989 filed Mar. 6, 2014, now U.S. Pat. No. 9,444,567, which is a continuation of prior U.S. application Ser. No. 13/623,828, filed on Sep. 20, 2012, now U.S. Pat. No. 8,707,077, which claims foreign priority under 35 U.S.C. 119 from GB application 1209312.6, filed on May 24, 2012, and from GB application 1116521.4, filed on Sep. 23, 2011, all of which are incorporated herein in their entireties for all purposes.

BACKGROUND

Field

This invention relates to methods and apparatus and systems for time synchronisation in wireless networks and in particular to wireless networks of the type where time synchronisation is important to obtain acceptable performance from receiving units in a wireless network, such as in audio and video functions and other multi-media functions.

Related Art

The IEEE 802.11 Wi-Fi standard is commonly used for many wireless applications between computing devices, network servers and the like. It is increasingly being used in domestic applications for functions such as streaming audio data, streaming video data, and other multi-media applications such as gaming using portable gaming devices. Data which is to be transmitted to a plurality of stations (STA) in a wireless network is provided via an access point (AP). This broadcasts the relevant data and it is detected by one or more receivers or stations for which it is intended.

Each station in the network will have circuitry associated with it to process the data in accordance with the type of data received. For example, a pair of wireless speakers will each receive left and right channels of an audio signal and will have to decode this and play it back for a user to listen to. The circuitry in each station will have a free running clock. This is usually a crystal based oscillator and it is common for these not to be particularly accurate, and they are therefore often not synchronised with each other between stations. Thus, for e.g. a pair of loud speakers the free running clock used to control playback may be faster in one loud speaker than in the other which will gradually cause the left and right channels to become less synchronised.

Time protocols such as NTP, e.g. NTPRFC1305, are commonly used to provide a strict timing mechanism over standard wired distribution systems e.g. Internet wired networks.

SUMMARY

NTP is such a commonly used protocol, it is desirable to use it when transmitting data in a wireless network for many applications, such as audio. However, a problem arises because a time protocol such as NTP within a wireless system experiences asymmetric receive and transmit paths which can differ as to the degree of asymmetry between different units in the system. Therefore, a station using a time protocol such as NTP via a Wi-Fi network will suffer from inaccuracies due to the asymmetric paths and hence may not be synchronised with other stations.

We have appreciated that Wi-Fi transmission standards such as IEEE802.11 include a timing beacon (time synchronisation function—TSF) provided by a physical layer clock at an Access Point which is required to be processed by a receiver as a priority, and furthermore this forms a fast and direct half-symmetrical path between the AP and each station. The Wi-Fi receiver in each station has its own physical layer free running clock, used by the processing circuitry at the station. This is reset to synchronise with the timing beacon from an AP in a received Wi-Fi signal. Thus, the physical layer clocks in the receivers can be synchronised using the TSF. The difference between the received AP-TSF and the STA free running clock in the Wi-Fi receiver provides an error between the AP clock and the STA station clock and this can be used to provide a finer correction value for a higher level time synchronisation method (such as NTP), such that the station clocks in a plurality of stations are more closely synchronised.

In one aspect, there is provided a wireless station for reception and playback of media transmitted in a wireless media distribution system. The station has a physical layer which includes a physical layer clock and further includes receiver and decoder circuitry for repeatedly receiving and decoding a broadcast beacon frame and a timestamp included therein. The physical layer clock is configured to control its output clock signal in a dependence on the timestamp. A transport layer operates using a transport layer time synchronisation protocol and includes a clock interface connected to the physical layer clock to convert a clock signal from the physical layer clock to a form suitable for use as a clock source by the transport layer time synchronisation protocol. An operating system clock is provided and controlled by the transport layer time synchronisation protocol for reception and playback of media.

In another aspect, there is provided a method for controlling an operating system clock in a wireless station for reception and playback of media transmitted in a wireless media distribution system. The method comprises receiving a broadcast beacon frame in a physical layer of the station and decoding the beacon frame to derive a timestamp. An output clock signal of a physical layer clock is controlled in dependence on the timestamp. The output clock signal of the physical layer clock is converted to a form suitable for use as a clock source by a transport layer time synchronisation protocol in a transport layer. An operating system clock is controlled for media reception and playback with the transport layer time synchronisation protocol.

In a further aspect, there is provided a wireless media distribution system with an access point for broadcasting media and a plurality of stations for reception and playback of media. The access point is configured to transmit repeatedly a beacon frame which includes a timestamp derived from a physical layer clock in the access point. Each station is configured to receive and decode the timestamp in each beacon frame and to control an output clock signal of a station physical layer clock in dependence on the timestamp and to use the output clock signal of the physical layer clock as a clock source for a transport layer time synchronisation protocol in a transport layer of the station. These exemplary aspects allow a variety of embodiments to be realized according to their disclosures, which are defined with more precision in the appended claims.

BRIEF DESCRIPTION OF THE DRAWINGS

An example will now be described in detail by way of example with reference to the accompanying drawings in which:

FIG. 1 shows schematically a Wi-Fi network of the type to which the invention may be applied, which uses NTP as an example time protocol.

FIG. 2 shows the arrangement of FIG. 1 with physical layer clocks at the AP and STAs being used for synchronisation;

FIG. 3 shows a schematic diagram of an AP physical layer clock and associated circuitry;

FIG. 4 shows a first embodiment of an STA physical layer clock and associated circuitry;

FIG. 5 shows a second embodiment of an STA physical layer clock and associated circuitry; and FIG. 6 shows the relationship between a physical layer clock and an NTP clock and circuitry in the application layer of a Wi-Fi system.

DETAILED DESCRIPTION

FIG. 1 illustrates the known technique for time-synchronising two wireless stations using an application layer protocol such as NTP. In this example, there are two stations (STA) 2 that are playing back media from a media source 4. The media source can be located in the internet (e.g. a streaming service), connected to an AP 6 (e.g. stored on a local computer or network drive), or can derive from one of the stations (e.g. the media may be broadcast via DAB and received at one station equipped with a DAB receiver and provided to the other station over Wi-Fi). The two stations aim to playback the media in sync. This can comprise either playing back the same media from the two stations in sync (e.g. for multi-room playback) or playing different components of the media in sync (such as left and right stereo channels provided to different loud speakers).

The playback of the media is controlled by an operating system (OS) software clock 8 in each station 2, and the two stations can be arranged to start playback at a specific time, with the rate of playback determined by the respective OS clock 8. However, this relies on the OS software clocks in the stations being synchronised with each other. Generally, this is achieved using NTP (although other similar time protocols can be used). NTP is an application layer time synchronisation protocol, which can be used to control the OS software clock at each station. With NTP, each station periodically polls a time server 10 accessible over the internet (typically an atomic clock server). This returns a time value, and NTP can use this in combination with other measured network statistics to predict a "real" time value. In an ideal network environment (such as wired Ethernet LAN), NTP can give good synchronisation (~1 ms accuracy), which is adequate for multi room playback.

However, there are problems with using an NTP-based solution such as that described above in a wireless environment such as Wi-Fi. Specifically, the asymmetric receive and transmit paths can result in an inaccurate prediction being applied by NTP, and hence the OS software clocks in each station will not be adequately synchronised, as discussed above. Furthermore, for applications such as left/right stereo channel synchronisation, even higher accuracy is needed (around 10 us) which NTP cannot usually achieve. Therefore, the above type of NTP-based system is not suitable, particularly for left/right channel synchronisation but also for some multi room applications.

Alternative prior art solutions have moved away from NTP entirely, but these bring their own problems as they usually use a proprietary synchronisation protocol. This results in non-standard STAs being used (as generally one must act as a master to sync with the others). In addition, it precludes any mixed systems where some stations are wireless and others are connected to a wired network.

Embodiments of the present invention retain the use of the NTP application layer time synchronisation protocol to synchronise the OS clock 8 at each station 2. However, in this instance, instead of NTP polling a remote time server 10 to synchronise clocks, the OS software clock in each station 2 uses a physical layer clock 12 at that station as a time source. Furthermore, the time source that NTP uses is switchable. In some cases where the NTP accuracy is adequate using an internet based timeserver 10 (e.g. many multi room systems or where there are mixed wired and wireless stations). In other instances, where higher accuracy is required, the NTP time source is switched to a more accurate source which is in this case is the physical layer clock used to control wireless communication in each station and in the access point. Each station and access point has its own physical layer clock. The physical layer clock is used in e.g. IEEE802.11 for clocking frame data rates in the Wi-Fi system.

This is illustrated with reference to FIG. 2 in which the OS software clock 8 at each station polls a physical layer clock 12 at each station using NTP such that the physical layer clock 12 becomes the source of synchronisation for the OS software clock 8 at each station. The physical layer clock 12 at each station is further synchronised to a physical layer clock 14 at an access point 6.

FIG. 2 illustrates this arrangement in which NTP uses the physical layer clock 12 at each station as its timing source, and in this instance when the system is Wi-Fi based, a time synchronisation function is exchanged with the physical layer clock 14 at the access point 6 so as to substantially synchronise timings at two or more stations 2. As in FIG. 1 the media to be played back can be provided via a streaming service from the internet, via a unit connected to an access point 6, or, alternatively, can be embedded at one of the stations.

It will be appreciated that using such an arrangement each station independently synchronises its OS software clock to its own physical layer clock using NTP. This synchronisation is distributed amongst the stations and therefore no predefined hierarchy is required.

In the case of Wi-Fi systems such as that shown in FIG. 2 the physical layer clock 12 at each station is kept in synchronisation using a timing synchronisation function (TSF). This comprises the periodic creation of beacon frames and transmission of these using RF. This beacon frame is broadcast by the AP and therefore received by all stations.

FIG. 3 shows schematically the operation of a physical layer clock 14 at an access point 6. This comprises a free running local oscillator (e.g. a local crystal oscillator) 16 which generates a clocking signal and a counter arranged to increment at each clock "tick" or clock cycle. A framing unit 20 periodically creates beacon frames and transmits this using RF front-end circuitry 22 coupled to a Wi-Fi antenna 24. Each beacon frame, which is broadcast and received by all stations 2 comprises a time stamp field which contains a copy of the counter value from the AP counter 18. This feature of transmitting beacon frames is part of the Wi-Fi standard (IEEE802.11). The transmission of the beacon frame is fast and direct and all stations receive the frame substantially simultaneously. The beacon frame and TSF is typically broadcast every 100 ms or so.

In order to fully understand how this embodiment of the invention operates it is necessary to understand the structure of the physical layer clock in each station 2. This is shown in FIG. 4.

In a manner similar to that at the access point 6, the station 2 has a free running oscillator formed from a local crystal 28. A counter 30 is incremented on each clock cycle at each clock "tick" as happens at the access point. The intention is that the free running oscillator 28 in each station should produce a clock signal with the same frequency as the free running oscillator at the access point. However, there are variations between individual crystals used in each oscillator and as a result of these they run at slightly different rates. Because of this the counters at the access point and at each of the stations will be incremented at slightly different rates and even if periodically synchronised will drift over time between synchronisations.

To deal with this frequency variation and drift, when a station receives a beacon frame via its RF front-end 32, the time stamp field is extracted by a decoding block 34. This time stamp field includes the counter value of the counter at the access point. This counter value from the access point is then copied to the counter 30 in the station. Thus, each time a beacon frame and the time stamp field are received, the counter 30 at the station is resynchronised to the value of the counter 18 at the access point 6. As the beacon frame is transmitted at RF frequencies, the time delay involved in its transmission is insignificant. Furthermore, the beacon frame and time stamp are a low level function within the Wi-Fi standard and are not subject to significant processing delays which would require further compensation, and therefore insignificant delay is applied.

The physical layer clock 18 and its equivalent at the access point comprises the crystal oscillator and the counter which is a monotonic hardware counter formed in silicon. In a Wi-Fi chip it is this counter that is used by the whole chip as a low latency counter available to the upper processing layers as a common clock signal. In one example the clock may comprise a 24 bit counter ticking at 192 KHz, but other bit depths and frequencies are possible, and these are parsed to form an appropriate input to NTP.

In the embodiment illustrated here, the station physical layer clock also comprises additional functionality which is used to rate-control the counter 30. This is provided to align the station counter 30 with the access point counter 18 as closely as possible such that the diversion between beacon frames is minimised and may be eliminated altogether. In this example, the station physical layer clock shown in FIG. 4 has a rate adjustment module 36 coupled between the local crystal oscillator 28 and the counter 30. This enables the rate at which the counter 30 is incremented by the crystal to be adjusted. For example, the rate adjustment module may be a software module controlling the tick rate provided to the counter 30. In another example, the rate adjustment module may be a hardware module such as a phase locked loop used to control the tick rate supplied to the counter 30. The rate adjustment module 36 is used to adjust the rate at which the clock signal increments the counter 30 to match, as closely as possible, the rate at which the access point local crystal oscillator 16 increments the access point counter 18. This is achieved by using a time stamp recordal and error calculation unit 38. This receives the time stamp from each decoded beacon frame and calculates the difference between the access point counter value contained in the time stamp and a current counter value from the station counter 30. This error is calculated before the station counter 30 is overwritten with the access point counter value. This may be achieved by using the time stamp and error calculating unit to repeatedly monitor the value of the counter 30 by updating a monitored value substantially simultaneously each time the counter 30 is updated. Alternatively, the timestamp and error calculation can count the number of clock ticks between arrival of the beacon frame and the STA counter being read and can correct the clock signals accordingly.

The time stamp and error calculating unit 38 therefore provides an error value between the access point and station counters 18 and 30 which represents the difference between them or the difference by which they have drifted since reception of the last beacon frame.

The error value thus derived can then be provided to a rate correction calculation module 40. This is used to determine how to control the rate adjustment unit 36 to adjust the station counter for the derived error. One way in which this can be achieved is through knowledge of the time elapsed since a previous correction and the current error value. This information, in combination with the error value enables the amount of drift between the access point counter and the station counter to be determined. The clock signal from the crystal can then be adjusted in the rate adjustment unit 36 to increment the station counter 30 at a rate much closer to the rate of the access point counter 18. Because this happens repeatedly at the reception of each time stamp, the error should tend towards a minimum over a relatively short period of time and using sufficiently accurate error calculation and rate adjustment circuitry will enable close alignment of access point and station counters 18 and 30.

The same technique is performed independently in each station 2 by using the respective physical layer clock in each station. This will result in a counter at each station which is closely synchronised to the access point counter and also to each other station counter.

The physical layer clock correction technique described above is not part of the Wi-Fi standard. However, we have appreciated that low level access to the Wi-Fi drivers can be made and this enables access to the received beacon frames and counter values. Thus, these have been used to obtain much closer synchronisation between access points and stations.

The above embodiment could be implemented without using the error calculation and rate adjustment. However, there would be greater drift between local oscillators between reception of beacon frames and the same drift would repeat and could not be reduced using the rate adjustment and clock correction module.

Another example of the physical layer clock in each station is shown in FIG. 5. As in FIG. 4 this comprises a local crystal oscillator 28 and a counter 30. The RF front-end circuitry 32 and decoding unit 34 receives beacon frames and from these decode and update the station counter 30 using the access point counter value from the beacon frames.

In this example, instead of rate controlling the station counter 30, the physical layer clock generates a pair of values corresponding to the access point counter and the station counter at the time at which the access point counter is received. These are generated in a time stamp and pair generation unit 42. This is referred to as a correlated access point and station counter pair. To achieve this, the arrival time of the access point counter is time stamped by the station counter 30 and the station counter value then read/derived from that time stamp. Once the correlated counter pair has been generated it can be passed to higher software layers for processing. These higher layers can perform compensation of the rate difference between the station crystal and the access point crystal 28. For example, this can be performed by an NTP clock interface as will be described below. Because the access point and station counter pair are correlated to the same time stamp, it does not matter if the higher layers take some time to process the pair and perform the compensation.

In this example, the higher software layers can use the correlated counter pair to monitor how much the station counter diverges from the access point counter over the course of the time period between beacon frames being received at a station. Preferably, this is monitored over several beacon frames to improve the accuracy of this divergence or drift. Once this drift is known a higher software layer can rate compensate the station counter value by determining the time since the last beacon frame and calculating how much the station counter will have diverged in that period and adjusting the current counter value accordingly.

By using either of the embodiments of the physical layer clock described with reference to FIGS. 4 and 5 above each station 2 has a counter 30 with much improved synchronisation to the access point counter 18. If implemented with sufficient accuracy, the station and access point counters will be substantially synchronised.

However, the counter in a physical layer clock is not in itself suitable for use with NTP. Because of this, an NTP clock interface in the application layer of the Wi-Fi system is required as shown in FIG. 6. This interface 50 takes a current counter value from the physical layer clock 52. If used in the second example described above with reference to FIG. 5 this may be rate compensated to adjust for any drift between the reception of beacon frames. The NTP clock interface parses the physical layer clock such that it is in a form suitable for use by NTP, that is to say it is placed in a similar form to that provided by internet clock servers. For the purpose of synchronising media playback between stations it does not matter if the NTP clock interface provides a correct time of day but what is important is that all the stations and their clocks are synchronised to the same time.

An NTP source selector 54 is configured to select the NTP clock from either the physical layer clock via the NTP clock interface 50 or from one or more internet based clock sources. This selection can be based upon the level of accuracy required or on the configuration of the overall system, or on other factors as appropriate. After this, NTP operates in the same way as it would in a known wired network environment. NTP periodically polls the clock source and the NTP source selected provides the clock values from the selected source to NTP accuracy predictor 56 which applies standard NTP prediction algorithms based on the round trip time (RTT) for the clock polling. In one example the algorithm can remain unchanged even though the clock source may be internal to the station (very short RTT). In other examples the algorithm can be optimised to take into account the local nature of the clock source. NTP adjustments are made to the operating system software clock 8 in a station based on the clock source values and the prediction.

This same process is carried out in all stations. Because of the synchronisation between the physical layer clocks achieved using the circuitry of FIG. 4 or 5, synchronised operating system software clocks are obtained in each station. Therefore, media playback on the different stations is synchronised using the thus synchronised operating system software clocks such that media is heard (in the case of audio) on a station in synchronisation which each other station.

Further enhancements to the above described system can use an additional feature of Wi-Fi to provide additional information to each of the stations on the state of synchronisation. The Wi-Fi standard includes a "probe request" frame which is sent from the stations to the access point to provide information on (amongst other things) supported data rates. However, the probe request frame also has a vendor specific field that can be used for other information. For example, the most recently calculated error value showing the difference between the access point counter and the station counter can be included in the field. Although the frame is primarily sent to the access point it is actually broadcast over the Wi-Fi network which means that all the other stations are able to receive it as well.

One or more of the stations can collect information on the error values from the other stations and this can be used to improve system performance, for example, it can be used as an input to the NTP selector. In this case, if the errors are all sufficiently low then it can switch to the TSF-based clock source or conversely if an STA has a high error due to poor reception, then an internet based source may be more reliable and should be selected by the NTP selector. In another example, this can be used to determine whether the errors are low enough to enable separate left and right stereo channels though different stations. If the result of this determination is that separate left and right channels will not be sufficiently synchronised then the system may be controlled to be revert to the same media (audio) playback through each channel, that is to say without any stereo separation. In a further example the information can be provided to the user to help the user site the STA's such that sufficient accuracy is achieved to enable stereo channels to be output. This is particularly useful in environments where there is significant multi path distortion.

What is claimed is:

1. A wireless network, comprising:
   an access point comprising an access point counter, wherein the access point is arranged to encode and transmit a timing synchronization frame over the wireless network, the timing synchronization frame comprising a timestamp derived from the access point counter; and
   a wireless device comprising a first counter, a second counter, and receiver circuitry,
   wherein the wireless device is arranged to receive the timing synchronization frame and decode the timestamp, control the first counter in dependence on the timestamp, and, responsive to receiving the timing synchronization frame, to trigger a reading of the second counter for use by a synchronization function.

2. The wireless network according claim 1, wherein the second counter is controlled by the synchronization function.

3. The wireless network according to claim 2, wherein the wireless device is further configured to form a pair of values from the timestamp and the second counter reading for use in the synchronization function.

4. The wireless network according to claim 2, wherein the second counter is used to regulate playback of synchronized media from the wireless device.

5. A wireless device comprising:
- a physical layer comprising a counter and receiver and decoder circuitry for repeatedly receiving and decoding a timing synchronization frame and a timestamp included therein, wherein the counter is controlled in dependence on the timestamp; and
- an interface connected to the physical layer and arranged, responsive to the physical layer receiving the timing synchronization frame, to trigger a reading of a further counter for use by a synchronization function.

6. The wireless device according to claim 5, wherein the further counter reading and the timestamp form a pair of values used in the synchronization function.

7. The wireless device according to claim 6, wherein the pair of values are processed to perform clock rate compensation at the wireless device.

8. The wireless device according to claim 6, wherein the wireless device is further arranged to transmit the pair of values to a further device in a response frame.

9. The wireless device according to claim 5, wherein the further counter is a software counter.

10. The wireless device according to claim 5, wherein the further counter is a monotonic higher layer counter.

11. The wireless device according to claim 5, wherein the interface is configured to output a signal, and the signal is used to trigger the reading of the further counter.

12. The wireless device according to claim 5, wherein the further counter is used to regulate playback of synchronized media from the wireless device.

13. The wireless device according to claim 5, wherein the wireless station is arranged to control the physical layer counter by updating the counter value with a value derived from the timestamp.

14. The wireless device according to claim 5, wherein the timing synchronization frame is a broadcast beacon frame.

15. The wireless device according to claim 14, wherein the broadcast beacon frame is a Wi-Fi TSF frame.

16. A method for performing synchronisation at a wireless device comprising a physical layer having receiver circuitry and a counter, and an interface connected to the physical layer, the method comprising:
- at the receiver circuitry, repeatedly receiving and decoding a timing synchronization frame and a timestamp included therein;
- controlling the counter in dependence on the timestamp; and
- responsive to the physical layer receiving the timing synchronization frame, triggering a reading of a further counter at the wireless device for use by a synchronization function.

17. The method according to claim 16, further comprising forming a pair of values from the further counter reading and the timestamp for use in the synchronization function.

18. The method according to claim 16, further comprising regulating playback of synchronized media from the wireless device using the further counter.

19. The method according to claim 16, wherein controlling the counter comprises updating the counter value with a value derived from the timestamp.

20. The method according to claim 16, wherein triggering the reading of the further counter comprises outputting a signal from an interface.

* * * * *